United States Patent [19]

Kato et al.

[11] Patent Number: 4,904,058
[45] Date of Patent: Feb. 27, 1990

[54] LIQUID CRYSTAL DISPLAY PANEL

[75] Inventors: Shoichi Kato, Kawasaki; Kaoru Arai, Suzaka; Ikuo Tomita, Ebina, all of Japan

[73] Assignee: Fujitsu Limited, Kawasaki, Japan

[21] Appl. No.: 257,010

[22] Filed: Oct. 13, 1988

[30] Foreign Application Priority Data

Oct. 13, 1987 [JP] Japan .............................. 62-257633
Oct. 13, 1987 [JP] Japan .............................. 62-257634
Jun. 13, 1988 [JP] Japan .............................. 63-143553

[51] Int. Cl.$^4$ ................................................ G02F 1/13
[52] U.S. Cl. .................................... 350/335; 350/334; 350/337; 350/346
[58] Field of Search ................ 350/334, 335, 337, 346

[56] References Cited

U.S. PATENT DOCUMENTS

| | | | |
|---|---|---|---|
| 4,039,254 | 8/1977 | Harsch | 350/335 |
| 4,241,339 | 12/1980 | Ushiyama | 350/335 X |
| 4,443,065 | 4/1984 | Funada et al. | 350/335 |
| 4,844,569 | 7/1989 | Wada et al. | 350/335 X |

Primary Examiner—Andrew J. James
Assistant Examiner—Huy K. Mai
Attorney, Agent, or Firm—Staas & Halsey

[57] ABSTRACT

A double-layered super-twisted nematic liquid crystal display panel, comprising a drive cell having a first liquid crystal layer and control electrodes, and a compensator cell having a second liquid crystal layer. In the first aspect, the first and second liquid crystal layers have the same twist angle in reverse directions and the first liquid crystal layer has a product $\Delta n \cdot d$ of a birefringence $\Delta n$ and a panel thickness $d$ 1.02–1.20 times larger than that of the second liquid crystal layer. In the second aspect, the second liquid crystal layer has a twist angle larger than that of the second liquid crystal layer by 150°–210°, preferably about 180°.

11 Claims, 11 Drawing Sheets

BRIGHTNESS  DARKNESS

LIQUID CRYSTAL DISPLAY PANEL

BACKGROUND OF THE INVENTION

1. Field of the Invention

The present invention relates to a liquid crystal panel which can be used for a large scale display at, for example, a word processor, personal computer, and the like.

2. Description of the Related Art

As a liquid crystal display device whereby a color display is possible, there is a demand for a highly multiplexed liquid crystal display device by which a black and white display can be made by a simple matrix display, wherein the matrix has a large number of multiplexed lines. A conventional liquid crystal display panel comprises a pair of transparent substrates provided with a transparent electrode and an aligning film on the inside surfaces thereof, respectively, a liquid crystal layer sealed between the transparent substrates, and two polarizers sandwiching the transparent substrates, wherein liquid crystal molecules are twisted between the transparent substrates. The liquid crystal display device is divided into the following two groups, depending on a twist angle of the liquid crystal molecules: A twisted nematic (TN) type device having a twist angle of about 90° (display by rotation of light), and a super-twisted nematic (STN) type device having twist angle of more than 90° (display by birefringence of light). In the above-mentioned TN-type liquid crystal display panel, however, an abrupt change of light transmittance in relation to applied voltage does not occur and strongly dependent on the viewing angle, and therefore, a high information density display having about 400 black lines on the white background cannot be obtained by a simple matrix structure, since with a high information density display, i.e., having a small duty ratio, such as 1/200, i.e., 200 multiplexed lines, close voltages are applied to selected and unselected elements respectively.

In the above-mentioned STN-type liquid crystal display panel, an abrupt change of light transmittance in relation to applied voltages can occur, and thus a high information density display can be obtained. But this STN-type uses light birefringence for the display, which has a large light dispersion at a specific wave length and thus causes coloration of the display, such as a black image on yellow-green background (yellow mode) or a blue image on a white background (blue mode). As a result, it is difficult to obtain not only a black and white display but also a color display, even when a color filter is used.

An object of the present invention is to provide a liquid crystal display panel wherein an abrupt change of light transmittance in relation to applied voltage occurs and a light dispersion of transmitted light is reduced, i.e., to provide a liquid display panel whereby a large capacity display with a large number of white lines on a black background can be obtained.

SUMMARY OF THE INVENTION

The above and other objects are obtained, according to a first aspect of the present invention, by providing a double-layered super-twisted nematic liquid crystal display panel comprising: (A) a first liquid crystal cell including (i) first super-twisted nematic liquid crystal layer having a first layer thickness $d_1$ and containing first liquid crystal molecules having a first birefringence $\Delta n_1$ and a first twist angle of not less than 180° in a first direction, and (ii) transparent matrix-type electrodes sandwiching the first liquid crystal layer and selectively modulating a state of twist of the liquid crystal molecules of the first liquid crystal layer by selectively applying a voltage thereto; (B) a second liquid crystal cell adjacent to the first liquid crystal cell, the second liquid crystal cell including a second super-twisted nematic liquid crystal layer having a second layer thickness $d_2$ and containing second liquid crystal molecules having a second birefringence $\Delta n_2$ and a second twist angle of not less than 180° in a second direction, the second twist angle being almost the same as the first twist angle, and the second twist direction being reverse to the first twist direction; and (C) polarizing means for visibly enhancing the modulated and non-modulated states of the first liquid crystal molecules in the first cell; wherein a product $\Delta n_1 d_1$ of the first birefringence $\Delta n_1$ and the first layer thickness $d_1$ of the first liquid crystal layer is in a range of 0.51–1.68 μm and is 1.02–1.20 times larger than a product $\Delta n_2 d_2$ of the second birefringence $\Delta n_2$ and the second layer thickness $d_2$ of the second liquid crystal layer.

The above and other objects are also obtained, according to a second aspect of the present invention, by providing a double-layered super-twisted nematic liquid crystal display panel, comprising: (A) a first liquid crystal cell including (i) a first super-twisted nematic liquid crystal layer containing a first liquid crystal molecules having a first twist angle $T_1$ of not less than 180° in a first direction, and (ii) transparent matrix-type electrodes sandwiching the first liquid crystal layer and selectively modulating a state of twist of the liquid crystal molecules of the first liquid crystal layer by selectively applying a voltage thereto; (B) a second liquid crystal cell adjacent to the first liquid crystal cell, the second liquid crystal cell including a second liquid crystal layer containing second liquid crystal molecules having a second twist angle $T_2$ in a second direction, the second twist direction being reverse to the first twist direction; and (C) polarizing means for visibly enhancing the modulated and non-modulated states of the first liquid crystal molecules in the first cell; wherein the second twist angle $T_2$ is in a range from $T_1 + 150°$ to $T_1 + 210°$.

DESCRIPTION OF THE PREFERRED EMBODIMENTS

First, a liquid crystal display panel according to the first aspect of the present invention will be described.

Figure 1:
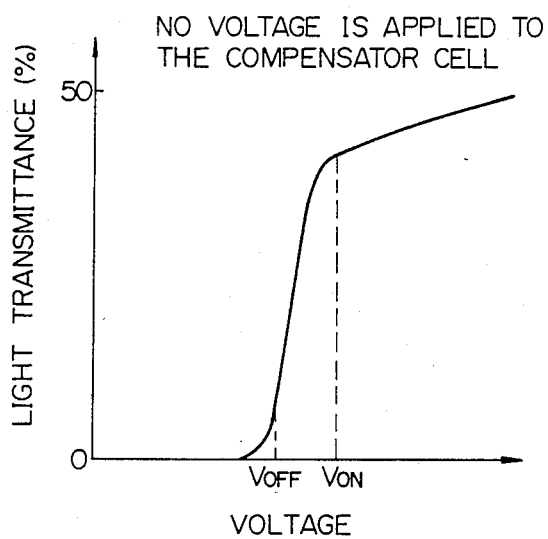
FIGS. 1 and 2 show the light transmittance of an STN liquid crystal panel in relation to the applied voltage.

FIG. 1 shows the light transmittance of a liquid crystal panel in relation to the applied voltage, this panel having a double layered structure of drive and compensator cells having the same twist angle of liquid crystal molecules in reverse directions and the same Δn.d, the voltage being applied only to the drive cell and not to the compensator cell. The light transmittance begins a relatively abrupt increase at a certain applied voltage and this increase of the light transmittance is reduced at a next certain applied voltage. When a voltage $V_{ON}$ is applied to selected elements in the panel, a voltage $V_{OFF}$ is usually unavoidably applied to unselected elements, due to a crosseffect. A static drive method is known in which a voltage is not applied to unselected elements but is applied to selected elements in a panel. This drive method, however, is not widely used as it is not practically useful. A practically useful drive method is that using a dynamic drive, but this unavoidably causes a crosseffect. In a dynamic drive matrix display panel, an operation margin α, i.e., a ratio (α) of the voltages applied to selected and unselected elements is represented by the following formula:

$$\alpha = \frac{V_{ON}}{V_{OFF}} = \frac{n+1}{n-1}$$

where n is a number of multiplexed lines. From the above formula, it can be understood that, when the multiplexed line number is 200, the ratio α is only 1.0734, and when the multiplexed line number is 400, the ratio is 1.0513. Namely, when a voltage $V_{ON}$ is applied to selected elements, a voltage as high as 1/1.0734=0.9316 times the voltage $V_{ON}$ is applied to unselected elements, and as a result, light transmittance appears at unselected elements if a compensating voltage is not applied to the compensator cell. This is because, since an unselected voltage $V_{OFF}$ is applied to the drive cell but no voltage is applied to the compensator cell, the states of alignment of the liquid crystals in the two cells are different, and the compensator cell does not completely compensate the light transmitted by the unselected elements of the drive cell. As is obvious, this light transmittance by the unselected elements reduces the contrast ratio of the display on the panel.

Figure 2:
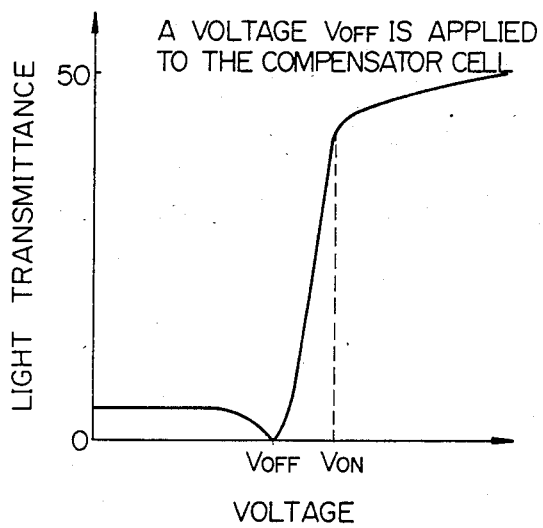

This reduction of the contrast ratio of the display can be prevented by applying the same voltage as the unselected voltage $V_{OFF}$ to a compensation cell having electrodes provided thereto, and the light transmittance of such a panel in relation to the applied voltage is shown in FIG. 2. In this case, however, the structure and control of the panel become complicated.

In contrast, according to the present invention, the optical characteristics of the compensator cell are made very similar to those of the unselected elements of the drive cell, by adjusting Δn.d, i.e., the product of the birefringence and the layer thickness of the liquid crystal layer of the compensator cell. Therefore, electrodes and the application of a voltage to the compensator cell are not necessary.

An example of a liquid crystal display panel according to the first aspect of the present invention is described below.

Figure 3:
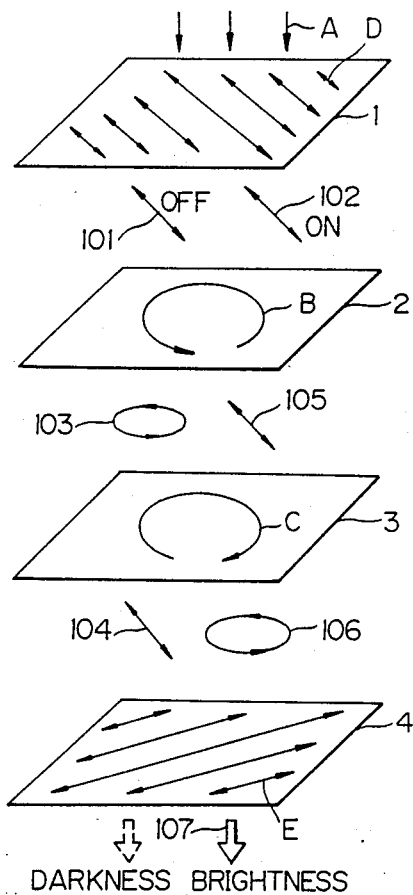
FIG. 3 is a perspective disassembled view of a panel according to the first aspect of the present invention.

FIG. 3 illustrates the basic structure of the panel. In FIG. 3, the panel comprises a stacked structure of a first polarizer 1 having a polarization axis D, to which the light A is incident; a drive cell 2 having a liquid crystal twisted at an angle of n less than 180° and provided with matrix-type controlling electrodes; a compensator cell 3 having a liquid crystal twisted at the same angle as that of the liquid crystal of the drive cell 2 but in the reverse direction, the compensator cell not having electrodes; and a second polarizer 4 having a polarization axis E.

The layer thickness of the liquid crystal layers of the drive and compensator cells are the same, but the birefringence Δn, which is a difference between the refractive indexes of the ordinary ray and the extraordinary ray of the liquid crystal molecules, of the liquid crystal of the compensator cell is smaller than that of the drive cell. The other parameters of the liquid crystal, such as elastic constant, dielectric constant, viscosity, helical pitch, phase transition temperature, etc., of the liquid crystals of the drive and compensator cells, are preferably as equal as possible.

Figure 7:
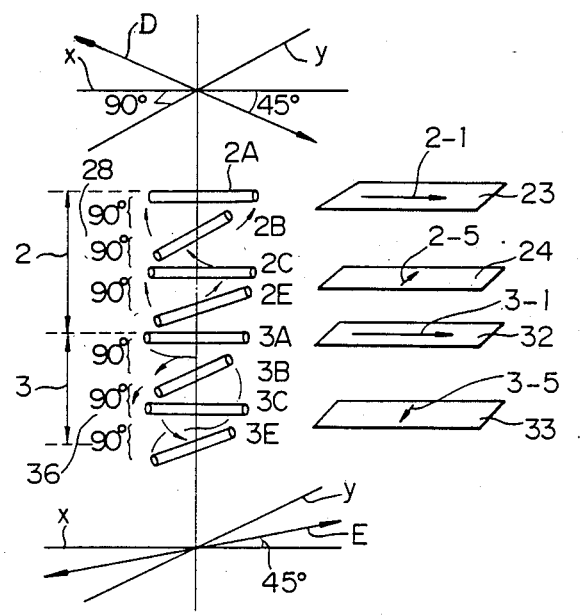
FIG. 7 shows the relationships between the directions of twist of the liquid crystal, the directions of the polarizers, and the directions of the aligning treatment, of the panel of FIG. 6.

The liquid crystal of the drive cell has a twist in the direction B, i.e., a leftward rotation in relation to the light incident direction A, and the liquid crystal of the compensator cell has a twist in the direction C, i.e., a rightward rotation in relation to the light incident direction A. FIG. 7 shows the directions of twist, polarizating axis, and alignment of the panel. In the drive cell 2, the liquid crystals twist from the liquid crystal molecule 2A aligned in the direction 2-1 to the liquid crystal molecule 2E aligned in the direction 2-5. In the compensator cell 3, the liquid crystals twist from the liquid crystal molecule 3A aligned in the direction 3-1 to the liquid crystal molecule 3E aligned in the direction 3-5. The directions of alignment 2-1 and 3-5 are made perpendicular to each other and the directions of alignment 2-5 and 3-1 are made perpendicular to each other. As described before, the twist angles of the liquid crystal of the cells 2 and 3 are made the same, and the cell thickness (layer thickness of the liquid crystal layer) and the pretilt angle of the cells 2 and 3 also are made the same.

As a result, as shown in FIG. 3 which illustrates the twist state of the liquid crystals in the cells, the respective parallel directions of the liquid crystal molecules 2A to 2E of the driving cell 2 are perpendicular to the respective parallel directions of the liquid crystal molecules 3E to 3A; i.e., the liquid crystal molecules at the same distance from the center of the panel on both sides thereof have parallel directions perpendicular to each other.

Figure 4:
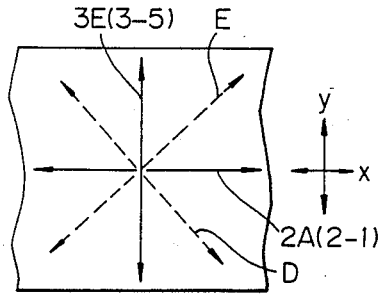
FIG. 4 shows the relationships between the twist directions of the cells and the polarization axis directions of the polarizers, of the panel of FIG. 1.

The polarizers 1 and 4 are arranged as shown in FIG. 4. When the parallel direction 2-1 of the liquid crystal 2A of the drive cell 2 is in the x axis direction and the parallel direction 3-5 of the liquid crystal 3E of the compensator cell 3 is in the y axis direction, the polarization axis D of the first polarizer 1 is turned 45° in the direction of a rightward rotation from the x axis and the polarization axis E of the second polarizer 4 is turned 45° in the direction of a leftward rotation from the x axis.

As described before, the drive cell 2 is provided with matrix-type control electrodes for modulating the twist states of the liquid crystal molecules, but the compensator cell 3 is not provided with a means for applying a electric field to the liquid crystal molecules, such as matrix-type control electrodes or all-over electrodes.

Figure 5:
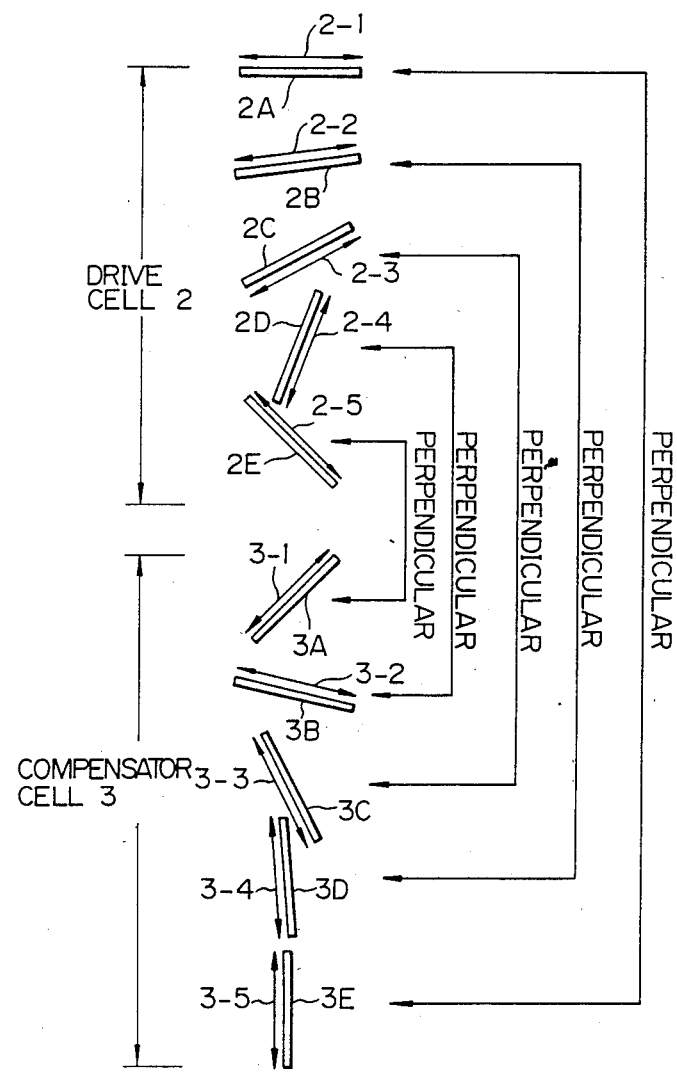
FIG. 5 shows the twist state of the liquid crystal of the cells of FIG. 1.

The propagation of the light through the abovedescribed panel is described with reference to FIGS. 3 and 5.

The light incident to the panel from outside in the direction A is polarized by the first polarizer 1 to form linearly polarized light 101 and 102. When a voltage $V_{ON}$ is applied to selected elements of the drive cell 2, an unselected voltage $V_{OFF}$, which can be calculated by the before-mentioned formula, is applied to unselected elements of the drive cell 2. At the unselected elements of the drive cell 2, the liquid crystal molecules are twisted even though the unselected voltage $V_{OFF}$ is applied thereto, and as a result, the linearly polarized light 101 becomes elliptically polarized light 103 after passing through the drive cell 2.

The elliptically polarized light 103 then passes through the compensator cell 3 and becomes linearly polarized light 104. As seen in FIG. 3, the liquid crystal molecules of the compensator cell 3 are symmetrically arranged with regard to the liquid crystal molecules of the drive cell 2, and the liquid crystals of the drive and compensator cells 2 and 3 have substantially the same optical characteristics, except for the birefringence thereof. As a result, the location of the light from the drive cell 2 is offset by the compensation cell 3. Although the unselected voltage $V_{OFF}$ is applied to the unselected elements of the drive cell 2, which changes the optical characteristics of the drive cell 2, the disturbance of the twist state of the liquid crystal due to the applied unselected voltage is fully compensated by the difference of the product $\Delta n.d$ of the compensator cell 3 from that of the drive cell 2, and thus the light transmitted through the compensator cell 3 becomes the linearly polarized light 104. The linearly polarized light 104 does not pass through the second polarizer 4 and the unselected elements are therefore displayed as the dark state.

On the other hand, the selected voltage $V_{ON}$ is applied to the selected elements of the drive cell 2 so that the liquid crystal molecules therein are made straight and upright, and as a result, the light transmitted through the drive cell 2 is still linearly polarized light 105 and is made elliptically polarized light 106 by the compensator cell 3 containing twisted liquid crystal molecules. Here, the compensator cell 3 should have a product $\Delta n.d$ of the birefringence $\Delta n$ and the cell thickness d in a range of 0.5–1.68 $\mu$m, preferably 0.80–1.07 $\mu$m, to change the linearly polarized light 105 to an elliptically polarized light. The elliptically polarized light 106 is changed to a linearly polarized light 107 after passing through the second polarizer 4, and the selected elements are displayed as the bright state.

Accordingly, the black and white display of a white image on a black background can be attained by a multiplex driving of the drive cell 2. The reverse display of a black image on a white background is of course possible by changing the application of a voltage between the selected and unselected elements.

Note that the birefringence $\Delta n$ of the liquid crystal may be modified by selecting the materials of the liquid crystal. In general, an increase or addition of the pyrimidine-system, biphenyl-system compounds increases the birefringence of the liquid crystal and an increase or addition of the cyclohexane-system and fluorine-system compounds reduces the birefringence of the liquid crystal.

A more detailed structure of a liquid crystal display panel according to the first aspect of the present invention is described below with reference to FIGS. 6 and 7.

Figure 6:
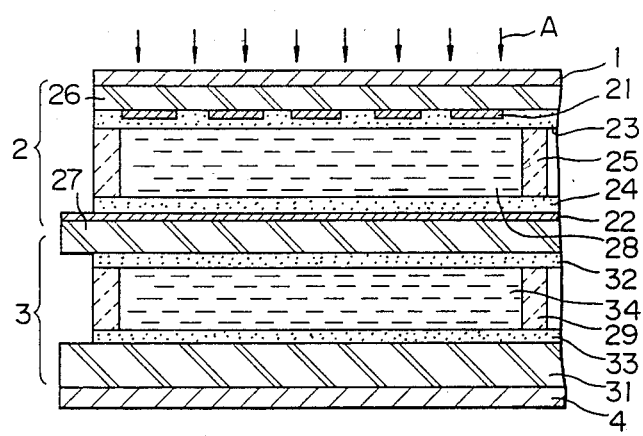
FIG. 6 is a side sectional view of a panel according to the first aspect of the present invention.

As seen in FIG. 6, a drive cell 2 and a compensator cell 3 are stacked between first and second polarizers 1 and 4. The drive cell 2 comprises transparent glass substrates 26 and 27 provided with transparent electrodes 21 and 22. The transparent electrodes 21 and 22 are composed of rows of strips perpendicular to each other and forming a matrix. The transparent electrodes 21 and 22 are covered with (polyimide) aligning films 23 and 24. The two transparent substrates 26 and 27 are assembled with an epoxy sealant 25 including spacers by which a space is formed therebetween which is filled with a liquid crystal 28. The other side of the transparent substrate 27 is provided with an aligning film 32 and assembled with another transparent glass substrate 31 to form a compensator cell 3. The transparent glass substrate 31 is also provided with an aligning film 33. A liquid crystal 34 is filled between the transparent glass substrates 27 and 31, with an epoxy sealant including spacers. The liquid crystal 34 is similar to the liquid crystal 28 except for the birefringence thereof.

Referring to FIG. 7, the rubbing direction of the aligning film 23 is taken as the x axis. The liquid crystal molecules 2A and 3E, 2B and 3C, 2C and 3B, and 2E and 3A are provided with projections to the surface of the substrate which are perpendicular to each other. The liquid crystal molecules of the cells 2 and 3 are twisted at an angle of not less than 180°, the direction thereof being reverse. The twist angle of a liquid crystal can be adjusted by selecting an amount of a chiral nematic liquid crystal, e.g., S-811, CB-15 (Merck), to be added. For an STN liquid crystal having a twist angle of not less than 180°, preferably around 270° or more, more than about 1% by weight of a chiral nematic liquid crystal should be doped to a nematic liquid crystal. The direction of the twist of the liquid crystals is adjusted by selecting a type of chiral nematic liquid crystal and the direction of the alignment treatment of the aligning films 23, 24, 32, and 33. The aligning film 23 is rubbed in the same direction as that 2-1 of the liquid crystal molecule 2A, the aligning film 24 in the direction 2-5, the aligning film 32 in the direction 3-1, and the aligning film 33 in the direction 3-5. Note that the rubbing direction 2-5 of the aligning film 24 is the reverse to the rubbing direction 3-5 of the aligning film 33. The cell thickness of the drive and compensator cells 2 and 3 is the same and the aligning film is made of the same material with the same density of rubbing. The first polarizer 1 has the polarization axis D turned at 45° from the x axis in the rightward rotation and the second polarizer 4 has the polarization axis E turned at 45° from the x axis in the leftward rotation.

The transparent electrodes 21 and 22 of the drive cell 2 are driven by a multiplex drive.

In the above-described panel, the following or other modifications can be effected: The transparent glass substrate 27 can be replaced by two transparent glass substrates, and the drive and compensator cells 2 and 3 can be interchanged. To obtain the required ratio of the product Δn.d between the drive and compensator cells, the cell thicknesses of the two cells with the same birefringence may be differed, instead of the different birefringence with the same cell thicknesses of the above example.

Experiments were conducted by manufacturing liquid crystal panels as shown in FIGS. 3 to 7 and changing the ratio of the products Δn.d between the cells and/or the duty cycle of the drive cell. An example of the manufactured liquid crystal panel has the following characteristics: The drive cell 2 had a number of the electrodes of 400 (a multiplexed duty cycle of 1/400); a cell thickness $d_1 = 7.2$ μm, a birefringence $\Delta n_1 = 0.153$, a twist angle of 270° (in the leftward rotation) and $\Delta n_1.d_1 = 1.102$. The compensator cell 3 has a cell thickness $d_2 = 7.2$ μm, a birefringence $\Delta n_2 = 0.141$, a twist angle of 270° (in the rightward rotation) and $\Delta n_2.d_2 = 1.015$: Therefore, the ratio of $\Delta n_1.d_1 / \Delta n_2.d_2 = 1.09$.

Figure 8:
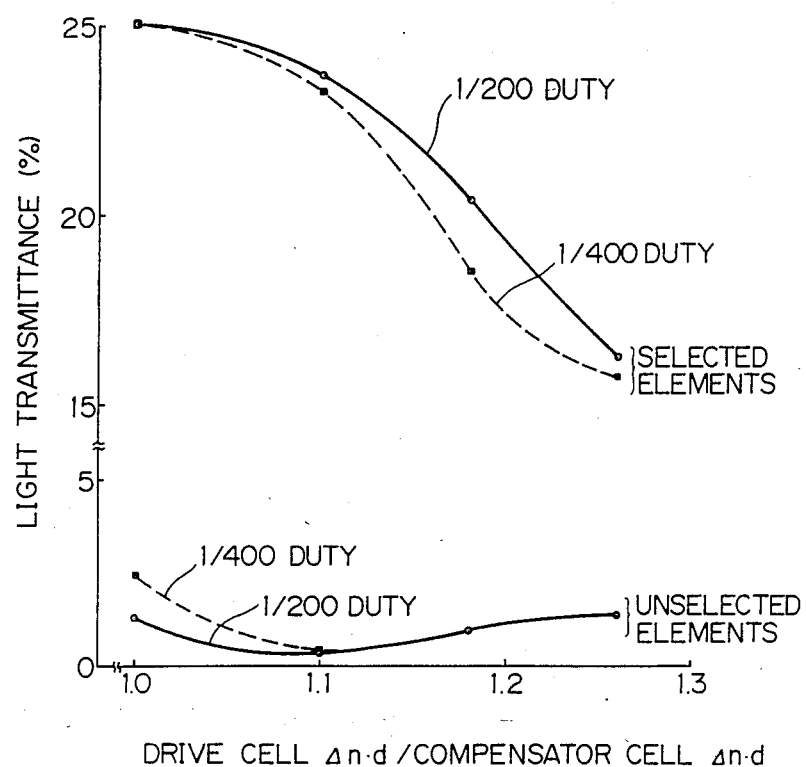
FIG. 8 shows the light transmittance in relation to the ratio of $\Delta n.d$ between the drive cell and compensator cell.

FIG. 8 shows the resultant light transmittance of the panel in relation to the ratio of the product Δn.d of the drive and compensator cells at a multiplexed duty cycle of 1/200 or 1/400. It is seen that at 1.0 of the ratio of the product Δn.d, the light transmittance at unselected elements is increased with an increase of the number of multiplexed lines, and that with an increase of the ratio of the product Δn.d, the transmittance at selected elements is decreased, but the transmittance at unselected elements is also decreased, and finally, again increased.

Figure 9:
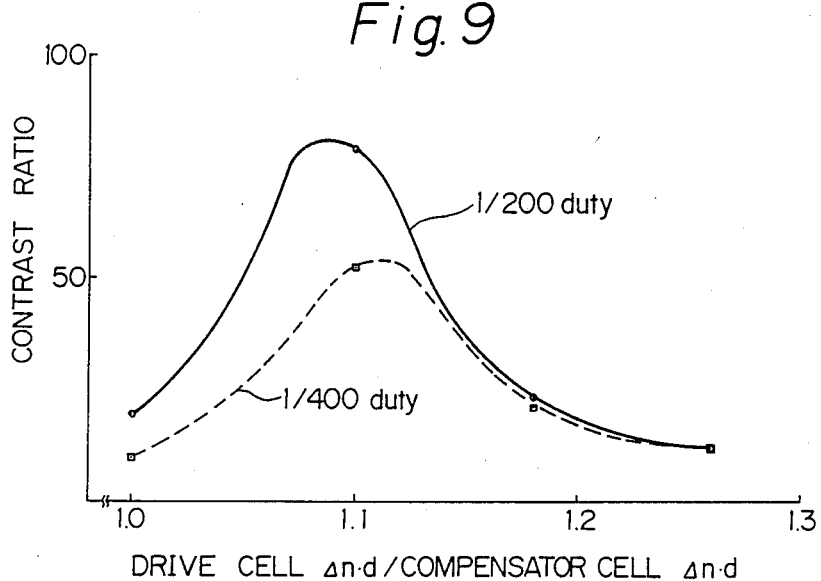
FIGS. 9 and 10 shows the contrast ratio of a display in relation to the ratio of Δn.d between the drive cell and compensator cell.

FIG. 9 shows the contrast ratio of the display, i.e, the ratio of the light transmittance at the selected and unselected elements, which is easily obtained from FIG. 8. It is seen that, by increasing the ratio of the product Δn.d, the contrast ratio is remarkably increased regardless of the duty cycle. It can be understood from FIG. 9 that the ratio of the product Δn.d is preferably in a range of 1.02–1.20, more preferably 1.06 to 1.12. Although the maximum contrast ratio obtained is smaller at a multiplexed duty cycle of 1/400 than at 1/20, the present invention is more important when the number of the multiplexed lines is larger since, in that case, the contrast obtainable without a difference of the product Δn.d of the drive and compensator cells is disadvantageously reduced.

Figure 10:
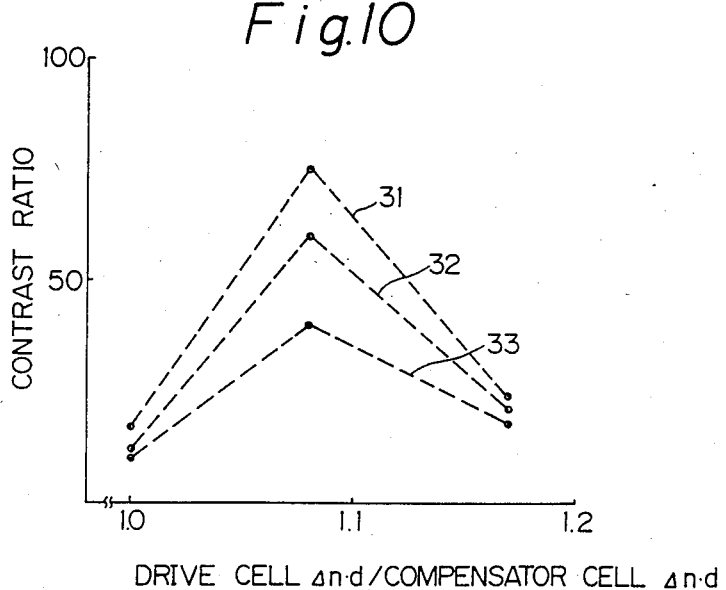

FIG. 10 shows the contrast ratio of the light transmittance of the selected and unselected elements in relation to the liquid crystal material and the twist angle. In FIG. 10, reference numeral 31 denotes a panel containing a first liquid crystal (birefringence: 0.152) with the twist angle of 260°, reference numeral 32 is a panel containing a second liquid crystal (birefringence: 0.132) with a twist angle of 260°, and reference numeral 33 is a panel containing a third liquid crystal (birefringence: 0.132) with a twist angle of 240°. In these cases, the multiplexed duty cycle is 1/200. It can be seen from FIG. 10 that the obtainable contrast ratio of the display depends on the kinds of liquid crystal material used, even when the liquid crystal has the same twist angle and the same ratio of the product Δn.d of the drive and compensator cells. Generally, the contrast ratio of the display is increased with an increase of the twist angle of the liquid crystal.

Figure 11:
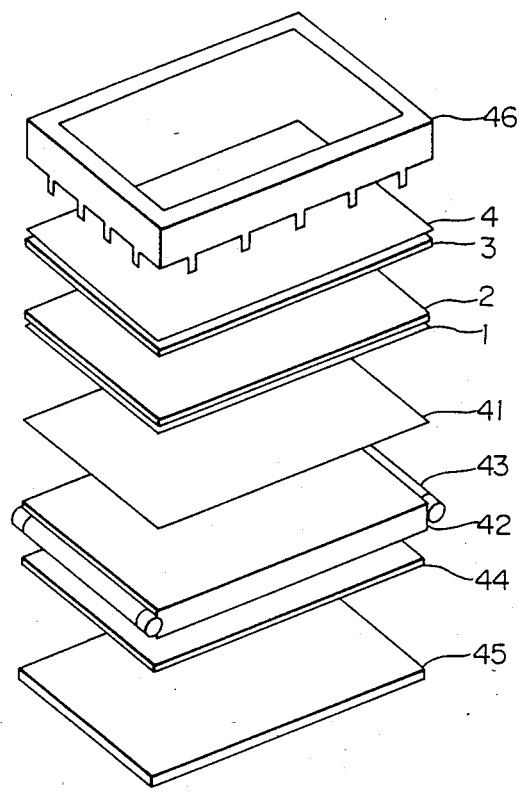
FIG. 11 is a perspective disassembled view of a liquid crystal display device.

FIG. 11 illustrates an example of a liquid crystal display device including a panel according to the present invention. In FIG. 11, reference numerals 1 to 4 denote the same members as mentioned before, i.e., 1 a first polarizer, 2 a drive cell, 3 a compensator cell, and 4 a second polarizer, and reference numeral 41 denotes a diffusion plate, 42 a light guiding plate of acryl resin, 43 a cold cathode fluorescent tube, 44 a reflecting plate, 45 a printed circuit board and 46 a bezel. These members are assembled to form a display device.

A liquid crystal panel according to the second aspect of the present invention will be now described.

This liquid crystal panel is similar to the panel of the first aspect of the present invention, except that the liquid crystal molecules of the compensation cell are twisted at an angle larger than that of the driving cell by 150°–210°, more particularly about 180°, although the product Δn.d of the driving and compensator cells may be the same. Further, as described below, the first and second polarizers are arranged to conform with the above twist angle of the liquid crystal, and thus realize a desired display.

Figure 12:
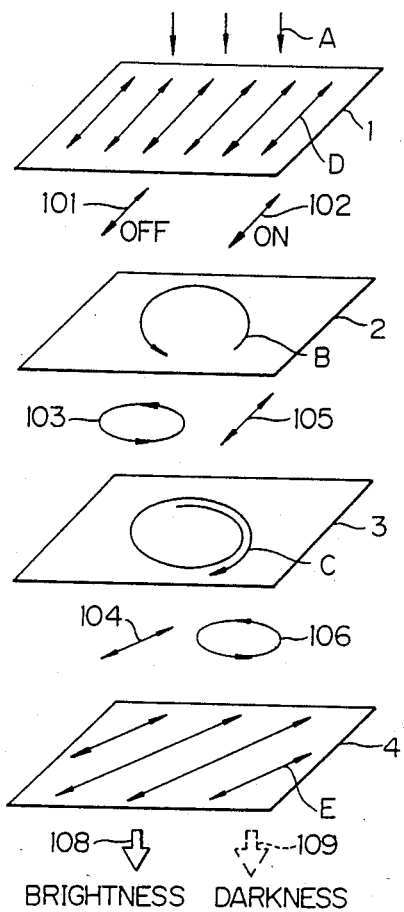
FIG. 12 is a perspective disassembled view of a liquid crystal display panel according to the second aspect of the present invention.
Figure 13:
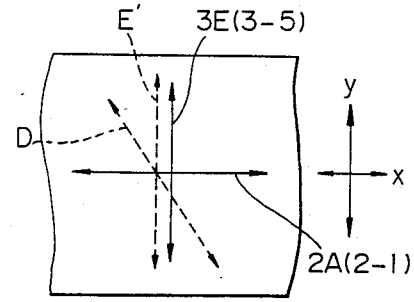
FIG. 13 shows the relationship between the directions of twist of the liquid crystal of the cell and the directions of polarization of the polarizers.
Figure 14:
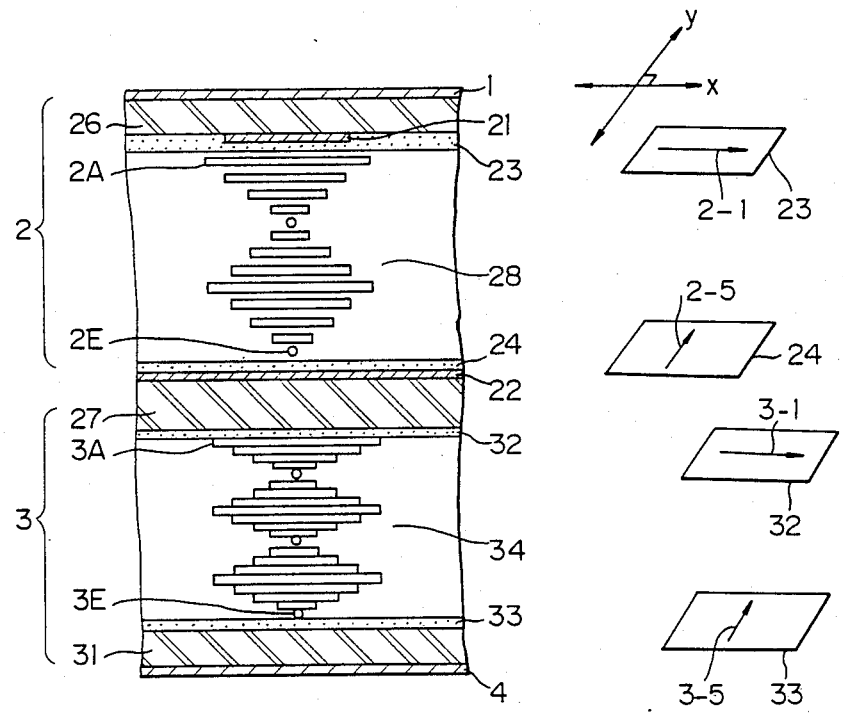
FIGS. 14 and 15 show the relationships between the directions of the twist of the liquid crystals, the direction of polarization of the polarizers, and the direction of the aligning treatment, of panels according to the second aspect of the present invention.

FIGS. 12 to 14 show the liquid crystal panel according to the second aspect of the present invention and correspond to FIGS. 3, 4, and 7, respectively. As described before, the compensator cell 3 contains liquid crystal molecules twisted by 450° (=270°+180°) from the liquid crystal molecule 3A aligned in the direction 3-1 to the liquid crystal molecule 3E aligned in the direction 3-5, and the second polarizer 4 is arranged so that the polarization direction E is in the y axis direction. The drive and compensator cells 2 and 3 have the same Δn.d, although the Δn.d of the drive cell 2 may be larger than that of the compensator cell 3, as in the first aspect of the present invention.

In this panel, the incident light A becomes elliptically polarized light 103 at the unselected elements and linearly polarized light 105 at the selected elements, after passing through the first polarizer 1 and the drive cell 2, as in the panel of the first aspect of the present invention. Then, the elliptically polarized light 103 becomes the linearly polarized light 104 after passing through the compensator cell 3 having the twist angle of 450°. This linearly polarized light 104 can be transmitted through the second polarizer 4 and displayed as the bright state. On the other hand, the above linearly polarized light 105 becomes the elliptically polarized light 106 after passing through the compensator cell 3. This elliptically polarized light 106, however, is close to the linearly polarized light due to the large twist angle 450° of the compensator cell 3, and as a result, it is difficult to transmit through the second polarizer 4, and thus is displayed as the dark state. Accordingly, the desired black and white display of a black image on a white background is realized by the panel, with a contrast ratio of 5. Note that, with a similar panel having a twist angle of the compensator cell of 270° and parallel polarization directions of the two polarizers, a desired display of a gray image on a white background is realized with a contrast ratio of 3.

Figure 15:
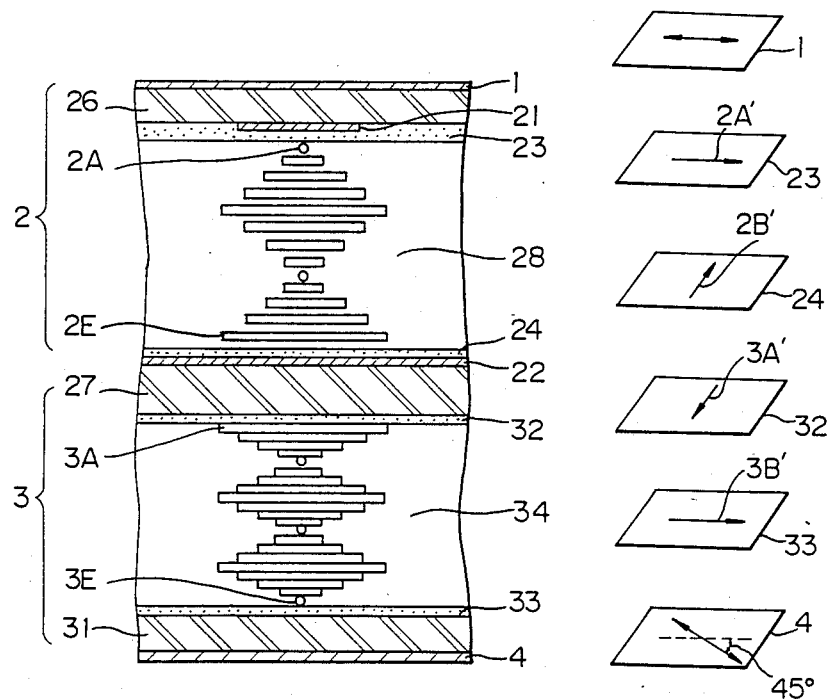

FIG. 15 illustrates another embodiment of the second aspect of the present invention, in which the liquid crystal molecule 2E of the drive cell 2 and the liquid crystal molecule 3A of the compensator cell 3 are aligned in parallel (in the same direction or at an angle of 180°). In this arrangement, the light transmittance of the panel is increased in comparison with the panel in which the above two liquid crystal molecules 2E and 3A are aligned perpendicular to each other, by about 10%.

It is understood that a black and white negative display can be easily obtained by turning the polarizers by 90° to the cells. Moreover, not only a transmitting type but also a reflection type display can be obtained.

Also, in a panel according to the second aspect of the present invention, the product $\Delta n.d$ of the drive cell may be made 1.02–1.20 times larger than that of the compensator cell.

Figure 16:
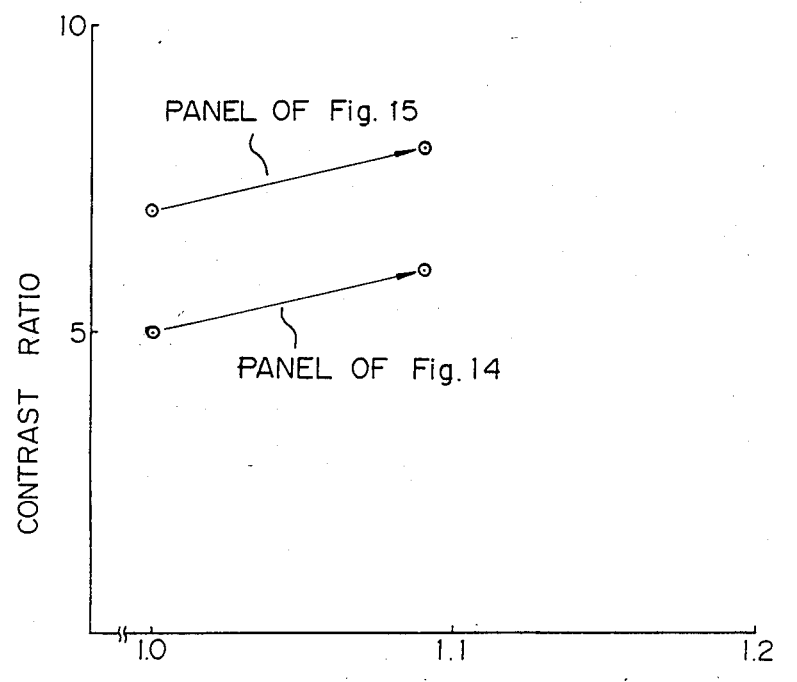
FIG. 16 shows the contrast ratio of a display in relation to the ratio of Δn.d between the drive cell and compensator cell.

FIG. 16 shows the results of experiments in changing the ratio of the product $\Delta n.d$ of the drive and compensation cells in the panels described with reference to FIGS. 12 to 14 and FIG. 15.

What is claimed is:

1. A double-layered super-twisted nematic liquid crystal display panel, comprising:
   (A) a first liquid crystal cell including:
      (i) a first super-twisted nematic liquid crystal layer having a first layer thickness $d_1$ and a first twist angle of not less than 180° in a first direction and containing first liquid crystal molecules having a first birefringence $\Delta n_1$, and
      (ii) transparent matrix-type electrodes sandwiching said first super-twisted nematic liquid crystal layer and selectively modulating a state of twist of said first liquid crystal molecules of said first super-twisted nematic liquid crystal layer by selectively applying a voltage thereto;
   (B) a second liquid crystal cell stacked with said first liquid crystal cell, said second liquid crystal cell including a second super-twisted nematic liquid crystal layer having a second layer thickness $d_2$ and a second twist angle of not less than 180° in a second direction and containing second liquid crystal molecules having a second birefringence $\Delta n_2$, said second twist angle being almost the same as said first twist angle, said second twist direction being reverse to said first twist direction; and
   (C) polarizing means for visibly enhancing modulated and non-modulated states of said first liquid crystal molecules in said first liquid crystal cell;
      wherein a product $\Delta n_1 d_1$ of said first birefringence $\Delta n_1$ and said first layer thickness $d_1$ of said first liquid crystal layer is in a range of 0.51–1.68 $\mu$m and is 1.02–1.20 times larger than a product $\Delta n_2 d_2$ of said second birefringence $\Delta n_2$ and said second layer thickness $d_2$ of the second liquid crystal layer.

2. A panel according to claim 1, wherein said transparent matrix-type electrodes have at least 200 multiplexed lines.

3. A panel according to claim 2, wherein said transparent matrix-type electrodes have at least 400 multiplexed lines.

4. A panel according to claim 1, wherein the product $\Delta n_1 d_1$ is in a range of 0.80–1.07 $\mu$m.

5. A panel according to claim 1, wherein the product $\Delta n_1 d_1$ is 1.06–1.12 times larger than the product $\Delta n_2 d_2$.

6. A panel according to claim 2, which obtains a contrast ratio of more than 6:1 of a visualized image.

7. A panel according to claim 3, which obtains a contrast of more than 8:1 of a visualized image.

8. A double-layered super-twisted nematic liquid crystal display panel, comprising:
   (A) a first liquid crystal cell including:
      (i) a first super-twisted nematic liquid crystal layer containing first liquid crystal molecules and having a first twist angle $T_1$ of not less than 180° in a first direction, and
      (ii) transparent matrix-type electrodes sandwiching said first liquid crystal layer and selectively modulating a state of twist of the liquid crystal molecules of said first super-twisted nematic liquid crystal layer by selectively applying a voltage thereto;
   (B) a second liquid crystal cell stacked with said first liquid crystal cell, said second liquid crystal cell including a second liquid crystal layer containing second liquid crystal molecules and having a second twist angle $T_2$ of not less than 180° in a second direction, said second twist direction being reverse to said first twist direction; and
   (C) polarizing means for visibly enhancing modulated and non-modulated states of said first liquid crystal molecules in said first liquid crystal cell;
      wherein said second twist angle $T_2$ is in a range from $T_1 + 150°$ to $T_1 + 210°$.

9. A panel according to claim 8, wherein $T_2 = T_1 + 180°$.

10. A panel according to claim 8, wherein a drive cell has a product of a birefringence of said liquid crystal and a cell thickness 1.02–1.20 times larger than that of a compensator cell.

11. A panel according to claim 10, wherein said drive cell has a product 1.06–1.12 times larger than that of said compensator cell.

* * * * *

UNITED STATES PATENT AND TRADEMARK OFFICE
CERTIFICATE OF CORRECTION

PATENT NO. : 4,904,058

DATED : February 27, 1990

INVENTOR(S) : Shoichi KATO et al.

Page 1 of 2

It is certified that error appears in the above-identified patent and that said Letters Patent is hereby corrected as shown below:

[57] ABSTRACT, line 7, change "$\Delta n.d$" to --$\Delta n \cdot d$--.

Col. 2, line 67, change "$\Delta n.d$" to --$\Delta n \cdot d$--.

Col. 3, lines 2, 18 and 30, change "$\Delta n.d$" to --$\Delta n \cdot d$--;
line 63, change "$V_{OFF}is$" to --$V_{OFF}$ is--.

Col. 4, line 5, change "$V_{OFF}to$" to --$V_{OFF}$ to--;
line 13, change "$\Delta n.d$" to --$\Delta n \cdot d$--;
line 25, change "n" to --not--.

Col. 5, line 26, change "$V_{OFF}$,which" to --$V_{OFF}$, which--;
lines 49 and 64, change "$\Delta n.d$" to --$\Delta n \cdot d$--.

UNITED STATES PATENT AND TRADEMARK OFFICE
CERTIFICATE OF CORRECTION

PATENT NO. : 4,904,058

DATED : February 27, 1990

INVENTOR(S) : Shoichi Kato, et al

It is certified that error appears in the above-identified patent and that said Letters Patent is hereby corrected as shown below:

Col. 7, lines 10, 17, 30, 33, 36, 42, 45, 52 and 68, change "$\Delta n.d$" to --$\Delta n \cdot d$--;
line 24, change "$\Delta n_1.d_1$" to --$\Delta n_1 \cdot d_1$--;
line 27, change "$\Delta n_2.d_2$" to --$\Delta n_2 \cdot d_2$--;
line 28, change "$\Delta n_1.d_1/\Delta n_2.d_2$" to --$\Delta n_1 \cdot d_1/\Delta n_2 \cdot d_2$--.

Col. 8, lines 21 and 36, change "$\Delta n.d$" to --$\Delta n \cdot d$--.

Signed and Sealed this

Second Day of July, 1991

*Attest:*

HARRY F. MANBECK, JR.

*Attesting Officer*  *Commissioner of Patents and Trademarks*